United States Patent [19]
Clanin

[11] Patent Number: 6,000,592
[45] Date of Patent: Dec. 14, 1999

[54] HOLSTER WITH REMOVABLE INSERT

[76] Inventor: Thomas S. Clanin, 575 Elinor Dr., Fullerton, Calif. 92835

[21] Appl. No.: 09/036,266

[22] Filed: Mar. 6, 1998

Related U.S. Application Data

[60] Provisional application No. 60/040,386, Mar. 10, 1997.
[51] Int. Cl.⁶ .................................................. B62J 11/00
[52] U.S. Cl. ........................... 224/413; 224/433; 224/929
[58] Field of Search .................................... 224/678, 679, 224/246, 242, 245, 565, 566, 901, 901.2, 901.8, 929, 930, 413, 433, 434, 435, 400, 401, 412, 428; 220/495.1, 495.08, 495.11

[56] References Cited

U.S. PATENT DOCUMENTS

| | | | |
|---|---|---|---|
| 3,396,885 | 8/1968 | Giondi | 224/434 X |
| 3,934,768 | 1/1976 | Jones | 224/246 |
| 4,050,615 | 9/1977 | Kline | 224/435 X |
| 4,260,004 | 4/1981 | Domke | 224/901.8 X |
| 4,724,791 | 2/1988 | McSorley | 224/406 X |
| 4,779,777 | 10/1988 | Johnson et al. | 224/930 X |
| 4,948,022 | 8/1990 | VanDyke | 224/901.8 |
| 5,114,060 | 5/1992 | Boyer | 224/435 X |
| 5,395,023 | 3/1995 | Naymark et al. | 224/901.8 X |
| 5,411,165 | 5/1995 | Ellis | 220/495.08 |
| 5,526,924 | 6/1996 | Klutznick | 224/901.2 X |
| 5,593,074 | 1/1997 | Matthews | 224/245 X |
| 5,816,459 | 10/1998 | Armistead et al. | 224/246 |

*Primary Examiner*—Gregory M. Vidovich
*Attorney, Agent, or Firm*—Robert D. Fish; Crockelt and Fish

[57] ABSTRACT

Methods and devices are provided for decreasing the likelihood of damage to a holstered gun. The devices include a combination of a holster, having a retaining cavity, and a removable insert which modifies the characteristics of the retaining cavity. In preferred embodiments, the removable insert decreases the likelihood of damage to a holstered gun which may arise from contact between the gun and a surface of the retaining cavity.

3 Claims, 2 Drawing Sheets

FIG. 1
PRIOR ART
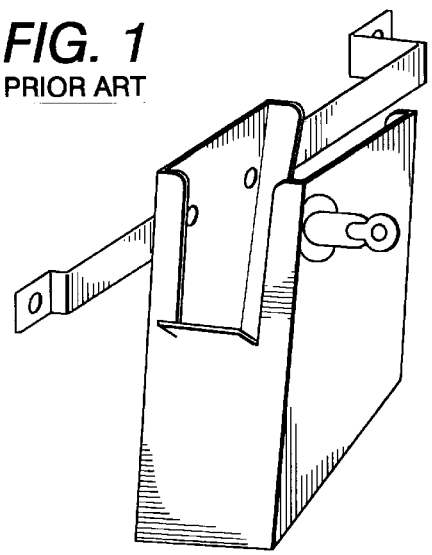
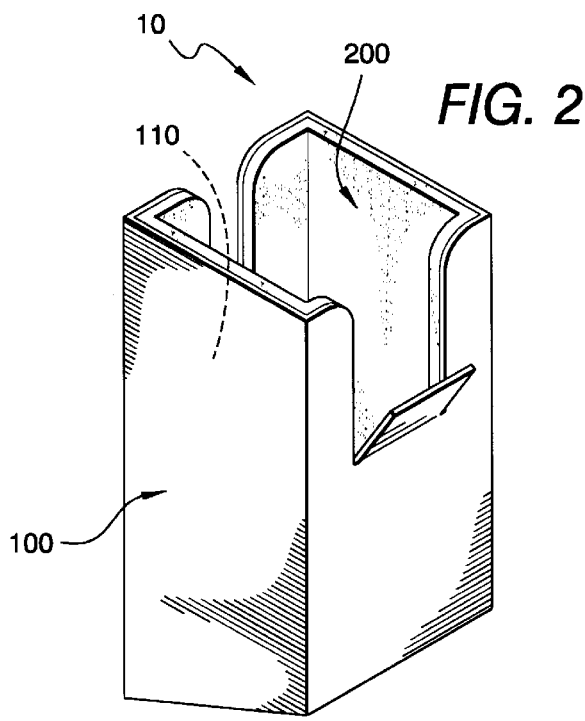
FIG. 2
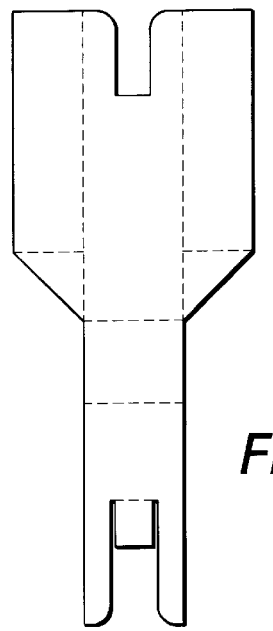
FIG. 4
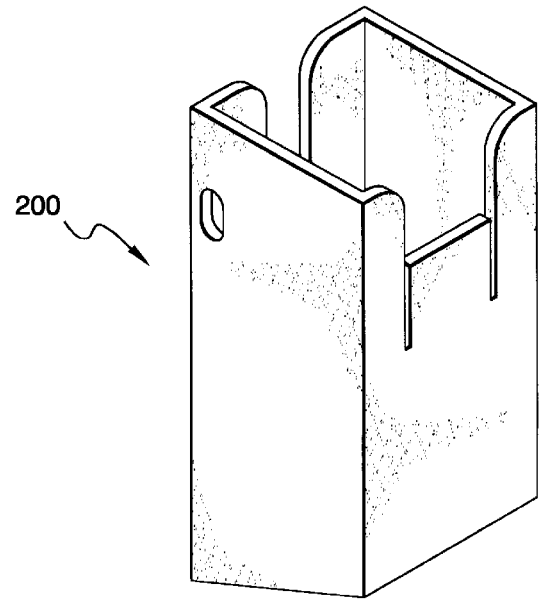
FIG. 5

HOLSTER WITH REMOVABLE INSERT

This application claims priority to provisional application Ser. No. 60/040,386 filed Mar. 10, 1997, said application being incorporated herein in its entirety by reference.

FIELD OF THE INVENTION

The field of the invention is holsters.

BACKGROUND OF THE INVENTION

Holsters are used to restrain and carry hand-held weapons such as guns and knives, as well as tools such as hammers and other hand tools, flashlights, and measurement and display devices such as radar guns and distance measuring devices. For the sake of simplicity, the term "gun" will sometimes be used herein to refer to all objects capable of being carried in a holster. Similarly, a gun at least partially in a holster may be said to be "holstered", and the act of placing the gun at least partially in the holster may be referred to as "holstering" the gun.

Holsters are frequently sized and shaped so as to include a retaining cavity in which a portion of a gun, when holstered, rests. The retaining cavity generally conforms somewhat to the shape of the portion of the gun within the cavity. The cavity generally maintains a fixed shape regardless of whether it currently contains a gun. In this manner known holsters promote quick and easy insertion and removal of a gun. Many holsters are formed from leather because leather is relatively stiff, yet lightweight and easy to work with and shape. Because leather is generally softer than the surface of the gun, leather holsters are less likely to damage a gun than a holster made from a harder material.

In some instances it may be advantageous to manufacture a holster in which at least a portion of the retaining cavity comprises a surface which is harder than leather, and possibly harder than the surface of the gun. Such holsters may be less expensive to manufacture or maintain, might be more weather resistant, and may be stronger than, for example, comparable all leather holsters. The additional strength might be useful in applications involving increased stress on the holster. One type of holster where a retaining cavity is substantially metal includes holsters mounted to a motorcycle to facilitate the carrying of radar guns. In that instance metal holsters are used to help prevent theft of, and/or accidental damage to a holstered gun. A typical holster for radar, laser and other hand-held measurement devices is depicted in prior art FIG. 1.

One possible problem with metal holsters is that they may tend to damage the outer surface of a holstered gun. This problem exists for any holster wherein a portion of the retaining cavity comprises a material which is harder than the surface of the gun to be holstered. Another possible problem with metal holsters is that their retaining cavities tend to conform poorly to the shape of the gun being holstered. Poorly conforming holsters tend to allow the gun to move or rattle within the holster, with such movement or rattling increasing the likelihood of damage to the gun. Such movement or rattling may also generate unwanted noise. The use of softer materials in forming the retaining cavity may also be problematic in that such materials tend to rot, weaken, or otherwise breakdown after prolonged exposure to the elements.

In an attempt to overcome some of these problems, the prior art metal holster of FIG. 1 uses a spray felt to cover the inside of the holster. Although the spray felt provides for a softer retaining cavity surface, the use of spray felt is disadvantageous for a number of reasons. Among other things it is difficult, if not impossible, to provide spray felt having a shape which conforms to that of a gun to be holstered. Another disadvantage is that the felt tends to suffer damage under prolonged use and exposure. Thus, the holster functionality decreases over time and may ultimately result in having to replace the holster.

Thus there is a continuing need for methods and devices to provide holsters comprising softer, better conforming retaining cavities, without decreasing the durability or useable life of the holsters.

SUMMARY OF THE INVENTION

Methods and devices are provided for decreasing the likelihood of damage to a holstered gun. Said devices include a combination of a holster, having a retaining cavity, and a removable insert which modifies the characteristics of the retaining cavity. In preferred embodiments, the removable insert decreases the likelihood of damage to a holstered gun which may arise from contact between the gun and a surface of the retaining cavity.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is an advertisement of a typical prior art holster for radar, laser and other hand-held measurement devices.

FIG. 2 is a schematic of a first preferred embodiment of the invention.

FIG. 4 is a first schematic of the insert of FIG. 2.

FIG. 5 is a second schematic of the insert of FIG. 2.

DETAILED DESCRIPTION

Referring first to FIG. 2, a combination 10 generally comprises a holster 100 and removable a insert 200.

Figure 3A:
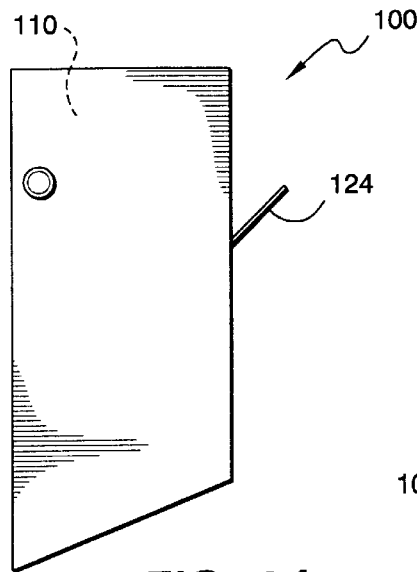
FIG. 3A is a side view of the holster of FIG. 2.
Figure 3B:
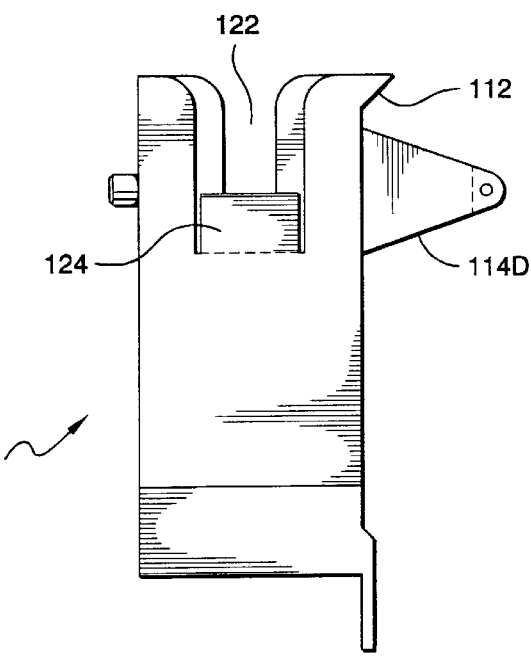
FIG. 3B is a front view of the holster of FIG. 2.
Figure 3C:
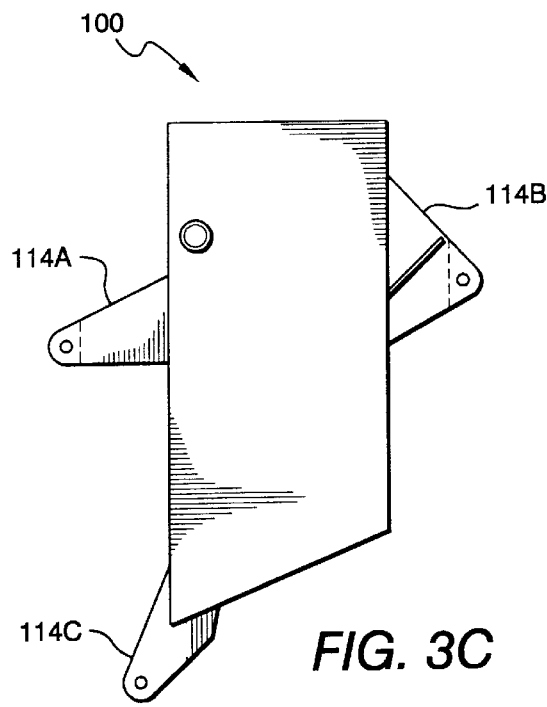
FIG. 3C is another side view of the holster of FIG. 2.
Figure 3D:
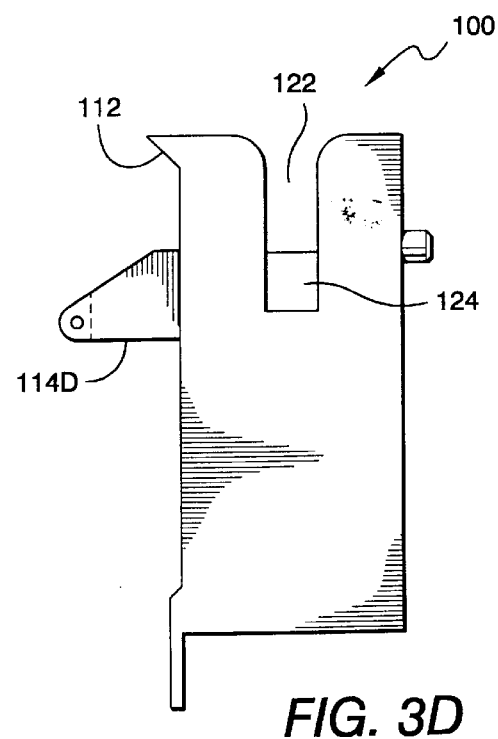
FIG. 3D is a rear view of the holster of FIG. 2.

Aspects of a preferred embodiment holster 100 are shown in FIG. 3. Here, it is preferred that all four sides and the bottom comprise sheeted aluminum, approximately 0.090"thick, which is powder coated for protection and aesthetic appearance. Although the preferred embodiment 100 has sides and bottom of uniform material, thickness, and coating, it is contemplated that the sides and bottom of holster 100 might be at least somewhat dissimilar. Thus, a material other than aluminum might be used for at least a portion of at least one side or bottom, and the thickness of at least a portion of at least one side or bottom might fall within the range of 0.001" to 0.09", 0.09" to 1", or other ranges having greater or lesser upper and/or lower limits.

The bottom and sides form retaining cavity 110 which preferably has the primarily rectangular shape shown. Other embodiments are also contemplated, however, and the overall shape may conform more or less than that shown to the shape of a portion of a gun. One aspect of particular interest is the flare or lip 112 at the upper right portion of the holster in FIG. 3B. Another aspect of particular interest is the positioning of the mounting brackets 114A, 114B, 114C and 114D, which would likely correspond with mounting arrangements on particular brands or types of vehicles. A still further aspect of interest is the channel 122 and shield 124 for a "Heads-Up-Display" type of laser or other gun. Construction of the holster is contemplated to include welding, folding, pressing, and other ordinary methods well within the knowledge and skill of those of ordinary skill in the art.

Aspects of a preferred removable insert 200 are shown in FIGS. 4 and 5. The insert 200 is prepared from a relatively soft and durable material such as neoprene. Neoprene of the type used for wet suits is especially preferred because it is soft, long-wearing, and essentially waterproof. However, other materials such as rubber, foam, or leather might be used, as might a composite or combination of multiple types of materials layered or otherwise combined together. It is preferred that insert 200 be removable from the holster to facilitate replacement or maintenance, and thus to potentially increase the useful life of the holster. Although it is preferred to use Velcro® (hook and loop fastener) or a similar means to fasten the insert within the retaining cavity, other means such as snaps, screws, or adhesives are also contemplated. It is also contemplated to eliminate fastenings altogether. Construction of the insert is contemplated to include stitching and other ordinary fabricating methods well within the knowledge and skill of those of ordinary skill in the art. Of course, it should be appreciated that it is preferred that the insert and holster should have substantially mating sizes and dimensions.

Thus, specific embodiments and applications of a combination of holster and a removeable insert have been disclosed. It should be apparent, however, to those skilled in the art that many more modifications besides those already described are possible without departing from the inventive concepts herein. For example, any holster, regardless of size or shape, could be used, as long as likelihood of damage to a holstered gun would be reduced by combining the holster with a removable insert. Similarly, it is possible to substitute almost any type of insert as long as the likelihood of damage to a holstered gun would be reduced by combining the insert with a holster. The inventive subject matter, therefore, is not to be restricted except in the spirit of the appended claims.

What is claimed is:

1. An improved radar gun holster having a hard outer body, motorcycle mounting brackets, and a retaining cavity, wherein the retaining cavity comprises a lidless inlet allowing access into the retaining cavity from the top of the holster, the improvement comprising:

a removable insert having an overall shape conforming to the shape of a mating portion of a radar gun located at least partially within the retaining cavity, and made from an essentially waterproof material, the insert not covering or obstructing the cavity inlet so as to prevent the radar gun from being received by the cavity, wherein the removable insert is elongated and has two ends, with one end being wider than the other end, wherein each of the two ends comprise a notch extending inward from the respective end.

2. The holster of claim 1 wherein the essentially waterproof material is neoprene.

3. The holster of claim 1 wherein the holster comprises a shield extending outward from the side of the holster, and the removable insert comprises a flap, which at least partially covers the shield.

* * * * *